United States Patent
Lee et al.

(10) Patent No.: US 8,415,003 B2
(45) Date of Patent: Apr. 9, 2013

(54) FLEXIBLE SUBSTRATE FOR DISPLAY PANEL AND MANUFACTURING METHOD THEREOF

(75) Inventors: KiYeon Lee, Chungcheongnam-do (KR); KyeongTaek Jung, Chungcheongnam-do (KR); KyuDong Lee, Chungcheongnam-do (KR)

(73) Assignee: Cheil Industries Inc. (KR)

( * ) Notice: Subject to any disclaimer, the term of this patent is extended or adjusted under 35 U.S.C. 154(b) by 656 days.

(21) Appl. No.: 12/603,214

(22) Filed: Oct. 21, 2009

(65) Prior Publication Data

US 2010/0272973 A1 Oct. 28, 2010

(30) Foreign Application Priority Data

Apr. 28, 2009 (KR) .................. 10-2009-0036933

(51) Int. Cl.
*B32B 7/02* (2006.01)
*B32B 5/16* (2006.01)
*B32B 27/32* (2006.01)
*B32B 17/10* (2006.01)
*B32B 37/06* (2006.01)

(52) U.S. Cl. ........ 428/213; 428/212; 428/323; 428/220; 428/339

(58) Field of Classification Search .................. 428/213, 428/212, 323, 220, 339; 156/60, 275.5
See application file for complete search history.

(56) References Cited

U.S. PATENT DOCUMENTS

| | | | |
|---|---|---|---|
| 6,693,746 B1 * | 2/2004 | Nakamura et al. | 359/580 |
| 6,888,593 B1 * | 5/2005 | Nakamura et al. | 349/96 |
| 2004/0017363 A1 * | 1/2004 | Nakanishi et al. | 345/173 |
| 2005/0118411 A1 * | 6/2005 | Horne et al. | 428/323 |
| 2007/0042163 A1 | 2/2007 | Ariga et al. | |
| 2007/0042168 A1 * | 2/2007 | Harada et al. | 428/292.1 |
| 2007/0166484 A1 * | 7/2007 | Shibue et al. | 428/1.54 |
| 2007/0190310 A1 * | 8/2007 | Yusa et al. | 428/323 |

FOREIGN PATENT DOCUMENTS

| | | |
|---|---|---|
| JP | 1995-165949 | 6/1995 |
| JP | 10168359 | 6/1998 |
| JP | 11330651 | 11/1999 |
| JP | 2004-51960 | 2/2004 |
| JP | 2004-191734 | 7/2004 |

(Continued)

OTHER PUBLICATIONS

Machine_English_Translation_of_JP_2006342311_A; High Refractive Index Thin Film; Jun. 10, 2005; JPO; whole document.*

(Continued)

*Primary Examiner* — David Sample
*Assistant Examiner* — Tahseen N Khan
(74) *Attorney, Agent, or Firm* — Cantor Colburn LLP

(57) ABSTRACT

A flexible substrate for a display panel and a manufacturing method thereof is disclosed. The flexible substrate may include a first film having a glass cloth located within a first heat-resistant resin, and a second film laminated on at least one side of the first film. The second film may include a second heat-resistant resin. The flexible substrate may further include an intermediate material between the first film and the second film. The intermediate material may be applied to an outer part of the first film and may adhere the first film to the second film.

12 Claims, 3 Drawing Sheets

FOREIGN PATENT DOCUMENTS

| | | |
|---|---|---|
| JP | 2004-233851 | 8/2004 |
| JP | 2004-280071 | 10/2004 |
| JP | 2004-322350 | 11/2004 |
| JP | 2005-140976 | 6/2005 |
| JP | 2005-153273 | 6/2005 |
| JP | 2005-208185 | 8/2005 |
| JP | 2006013135 | 1/2006 |
| JP | 2006026973 | 2/2006 |
| JP | 2006342311 A * | 12/2006 |
| JP | 2007-293048 | 11/2007 |
| KR | 1020080101488 | 11/2008 |
| TW | 531665 | 5/2003 |
| TW | 200633634 | 9/2006 |

OTHER PUBLICATIONS

Taiwan Office Action for application No. 098136501 dated Dec. 13, 2011 with English translation.

* cited by examiner

FLEXIBLE SUBSTRATE FOR DISPLAY PANEL AND MANUFACTURING METHOD THEREOF

CROSS-REFERENCE TO RELATED APPLICATIONS

This application claims priority to Korean Patent Application No. 10-2009-0036933, filed on Apr. 28, 2009, which is incorporated by reference herein in its entirety.

Not Applicable

BACKGROUND OF THE INVENTION

1. Technical Field

The present disclosure generally relates to a flexible substrate for a display panel and a manufacturing method thereof. More specifically, the present disclosure relates to a flexible substrate for a thin, transparent display panel that has low coefficients of thermal expansion and excellent flexibility, heat resistance, and surface roughness, which is formed by laminating a second film on a first film including a glass cloth.

2. Description of the Related Art

Display devices (e.g., liquid crystal display devices) that are commonly used at the present time often include transparent electrode substrates made of glass materials. However, glass substrates are typically thick and heavy, which limits their ability to achieve acceptable flatness and weight for liquid crystal display devices. Furthermore, glass substrates are vulnerable to impact and are particularly unsuitable for flexible displays because of their brittleness.

Accordingly, flexible substrates made of plastic optical film materials are now used as a substitute for glass substrates. Such flexible substrates exhibit good characteristics for advanced display devices, such as organic electroluminescent (EL) displays, electronic paper (e-paper), liquid crystal displays, and other displays.

Flexible substrates formed with the plastic optical film materials are thin and light as compared to glass substrates used in display panels. Moreover such flexible substrates have flexible properties and can be processed in various types. Hence, it is possible to realize lightness, flatness, surface display functions and other desirable features which are required for advanced display devices.

Thanks to the aforementioned advantages of the flexible substrates, significant research and development is being performed with respect to the flexible substrates' materials, structures and the like. Specifically, in an early stage of development, flexible substrates adopting transparent film materials that included plastic high molecules were used. Then, compositions using an epoxy resin, acid anhydride-series hardener and alcohol hardening catalyst were applied as materials for flexible substrates.

However, such originally produced flexible substrates exhibited large linear coefficients of expansion. In particular, when the flexible substrates formed with the above materials were used as active matrix display device substrates, various problems including bending during manufacturing and disconnection of aluminum wires occurred. In addition, the above materials have poor optical properties as compared to glass, such as CTE (Coefficient of Thermal Expansion), thermal characteristics and transparency or refractive index. Thus, such flexible substrates cannot be used in many situations.

Therefore, to use the plastic optical film materials as substrates for display panels, particularly, substrates for liquid crystal display devices, a need exists to develop plastic optical film materials having good heat resistance, high transmissivity, and low coefficients of thermal expansion and surface roughness.

Attempts to reduce coefficients of thermal expansion of the plastic optical film materials in accordance with such a need include a complex film structure configured by mixing an inorganic filler such as glass powder or a glass cloth with a resin. For instance, Japan Publicized Patent No. 2004-51960 discloses a resin sheet including an epoxy resin and glass fabric-type glass textile material, and Japan Publicized Patent No. 2004-233851 describes a transparent substrate made of a glass cloth and a resin. However, prior film structures and methods for manufacturing a transparent substrate by impregnating a glass cloth into a resin had various problems.

First, a process of manufacturing glass fiber in fabric type was particularly complex. In particular, if large films are manufactured using a hot process technique, film curling can occur. Such a process requires significant time and is complicated, which can result in increased production cost.

Second, when films into which a glass cloth is impregnated are manufactured using UV hardening resins, the completed films are not flat and are very rough, which can cause deterioration of picture quality of a display device due to contraction of the glass cloth and structural characteristics of the glass fiber.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "film" is a reference to one or more films and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a flexible substrate for a display panel comprises a film complex structure may include a first film having a glass cloth located within a first heat-resistant resin, and a second film laminated on at least one side of the first film, wherein the second film includes a second heat-resistant resin.

In an embodiment, a method for manufacturing a flexible substrate for a display panel may include manufacturing a glass cloth by configuring glass fiber in fabric type and manufacturing a first film by impregnating the glass cloth into a first heat-resistant resin, manufacturing a second film by hardening a second heat-resistant resin, and laminating and combining the second film on an upper part of at least one side of the first film.

Using a flexible substrate for a display panel and a manufacturing method thereof, it is possible to obtain a surface roughness improvement by use of the second film while reducing coefficients of thermal expansion by the first film through organic combination between the first film and the second film, thereby realizing a remarkable effect of improving size stability and surface roughness of a display panel substrate.

In addition, a film complex structure in which a solidified second film is adhered to a first film can prevent curl generation caused by contraction and expansion of a substrate. As such, scalability of the structure is improved and the manufacturing process is simplified, which results in increased productivity.

Moreover, if a heat-resistant transparent resin having no double refraction is used as a resin that constitute the second film, it may be unnecessary to consider matching of refractive indexes with first film. Accordingly, types of applicable resins can be diversified, further reducing manufacturing costs.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
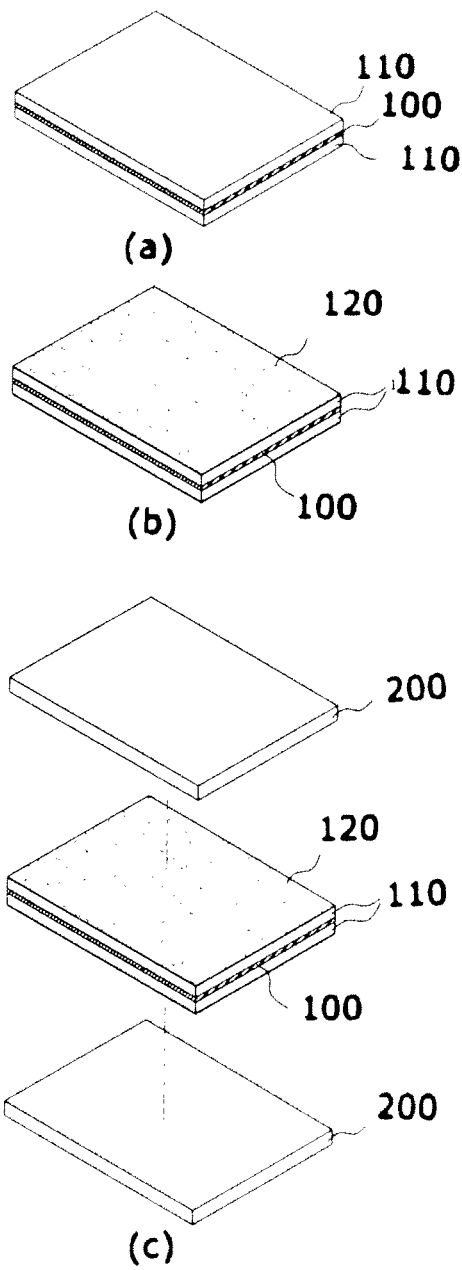
FIG. 1(a) to (c) are diagrams for illustrating a manufacturing process of a flexible substrate for a display panel in accordance with an embodiment.
Figure 2:
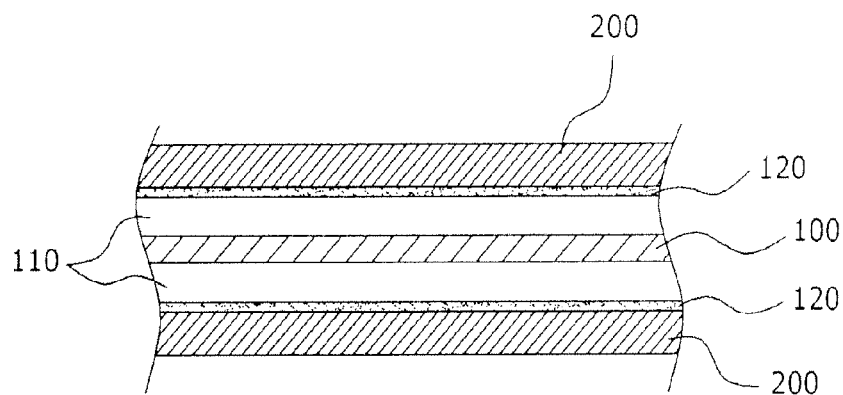
FIG. 2 is a sectional view of a flexible substrate finally completed through the manufacturing process of FIG. 1.
Figure 3:
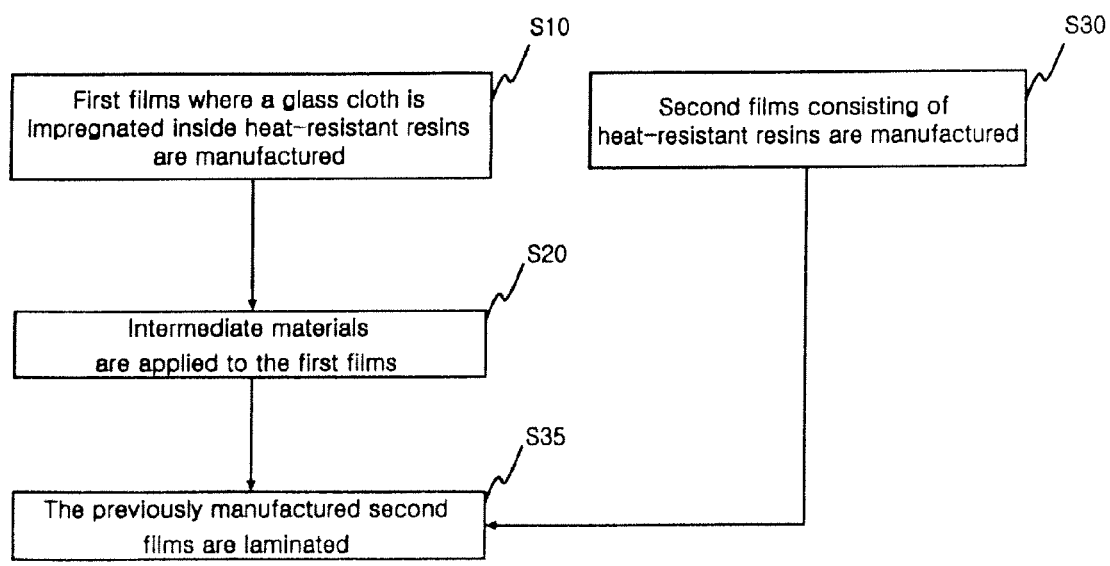
FIG. 3 is a flow diagram showing an operational sequence of a method for manufacturing a flexible substrate for a display panel in accordance with an embodiment.

Before explanation, it is noted that preferred embodiments to be described from now on regard a flexible substrate and a manufacturing method for a panel that requires a transparent substrate, such as a liquid crystal display device, among various display devices including liquid crystal display devices, organic electroluminescent (EL) display and electronic paper (e-paper).

In an embodiment, a flexible substrate may obtain an optical property, such as "more than 85% of transmissivity," and a thermal property, such as "less than 20 ppm of coefficients of thermal expansion." In an embodiment, it is possible to prevent contrast deterioration caused by surface roughness of a substrate when a liquid crystal display device panel is manufactured by improving the surface roughness of the substrate. In an embodiment, improved scalability of the flexible substrate as compared to other substrates may also be achieved.

In an embodiment, if a flexible substrate is applied to a display panel (e.g., organic EL, e-paper, solar cell, optical circuit board, etc.) for which transmissivity of a substrate is not of primary concern, collecting and applying a configuration for improving only a thermal property and surface roughness may be performed, without consideration for influencing transmissivity of the flexible substrate.

Hereinafter, features, embodiments, and advantages of the flexible substrate will be described in reference to FIGS. 1 to 4.

A flexible substrate for a display panel in accordance with an embodiment includes a film complex structure including a first film where a glass cloth 100 is impregnated inside a first heat-resistant resin 110, and a second film 200, including a second heat-resistant resin, is laminated on at least one side of the first film.

In an embodiment, a physical property of the flexible substrate is improved through the film complex structure. As such, a reduction in coefficients of thermal expansion over conventional plastic substrates may be achieved. Moreover, it is possible to improve contrast resulting from surface roughness as compared to prior resin sheets including a glass cloth.

In detail, the flexible substrate is manufactured by manufacturing a first film including a glass cloth 100 inside a first heat-resistant resin 110, applying intermediate material 120 made of a resin identical or substantially similar to the first heat-resistant resin 110 and/or a resin that is transparent and provides heat resistance, on both outer sides of the manufactured first film, and laminating a second film 200 with a second heat-resistant resin on the intermediate material 120. The second film 200 is manufactured prior to being adhered to the first film or the intermediate material 120.

(1) Step of Manufacturing the First Film

The first film is prepared by configuring glass fiber in a fabric to manufacture the glass cloth 100, and by hardening a liquid first heat-resistant resin after retting the manufactured glass cloth 100 in the liquid first heat-resistant resin.

As such, the first film formulates a resin sheet structure where the glass cloth 100 is impregnated inside the hardened first heat-resistant resin 110. The glass cloth 100 reduces substrate transformation that can occur during a panel process. The transformation of the substrate is reduced because the glass cloth 100 has a low coefficient of thermal expansion which offsets a relatively high coefficient of thermal expansion of a second heat-resistant resin.

A UV hardening or thermal hardening resin may be used as the first heat-resistant resin 110. More specifically, it is desirable to use at least one resin selected from heat-resistant resins having more than 200° C. of glass transition temperature, such as polysulfone, polyether, polyether imide, and polyarylate (PAR). Additional and/or alternate resins may also be used within the scope of this disclosure.

When the flexible substrate is applied to a liquid crystal display device process at more than 180° C., substrate transformation caused by high coefficients of thermal expansion of the resin may be minimized in order to obtain size stability.

Similarly, when applying the flexible substrate to a display panel, such as a liquid crystal display device, that needs a transparent substrate, optical properties such as refractive indexes and transmissivity should be considered as well as low coefficients of thermal expansion.

In an embodiment, a liquid crystal display device panel has a structure which allows light selectively transmitted by a liquid crystal to be displayed to a user after passing through the flexible substrate. Since the first film, which constitutes the flexible substrate, has a structure in which the glass cloth 100 is impregnated inside a resin sheet, a difference of refractive indexes between the first heat-resistant resin 110 and the glass cloth 100 may be minimized to display a clear image.

Thus, a refractive index of the glass cloth 100 in the first film may be matched with that of the first heat-resistant resin 110. As such, it is desirable to utilize a glass cloth 100 having a refractive index that differs from the refractive index of the first heat-resistant resin 110 by no more than approximately 0.01. In an embodiment, a UV hardening resin having refractive index of 1.556 may be employed in the first film, and the glass cloth 100 may include glass fiber having a refractive index of 1.55.

In an embodiment, the thickness of the flexible substrate may be about 30 μm to about 200 μm in order to be sufficiently flexible when being applied to a display device. In an embodiment, the thickness of the flexible substrate may be about 50 µm to about 100 µm.

In an embodiment, the second film 200 may be thinner than the first film so that the reduction in the coefficient of thermal expansion of the first film is not offset by the second film 200. If the second film 200 were thicker than the first film, an increase in the coefficient of thermal expansion may cause a lack of size stability of the flexible substrate.

As such, it is desirable to configure the first film to have a thickness of about 20 µm to about 90 µm, to optionally apply intermediate material 120 with a thickness of about 0.5 µm to about 5 µm between the first film and the second film 200, and to laminate and combine the second film with a thickness of about 10 µm to about 50 µm on the intermediate material or the first film.

The flexible substrate may improve surface roughness of the second film 200 to ensure a reduction in the coefficients of thermal expansion by the first film by organic combination between the first film with a thickness of about 20 µm to about 90 µm and the second film with a thickness of about 10 µm to about 50 µm.

(2) Step of Applying the Intermediate Material

When the first film is completely manufactured, the intermediate material 120 is applied to at least one outer side of the first film. The intermediate material 120 is configured to laminate and combine the second film 200 with the first film. A UV hardening or thermal hardening resin similar to those used in the first film may be employed for the intermediate material 120.

In an embodiment, the intermediate material 120 may include the same resin as the first heat-resistant resin 110. In an alternate embodiment, the intermediate material 120 may include a resin having similar transmissivity and heat resistance to the first heat-resistant resin 110. For example, if a polyarylate-series resin is used to manufacture the first film, the polyarylate-series resin may also be used for the intermediate material 120. In this manner, the best optical performance of a liquid crystal display device may be realized by laminating material on the first film that has the same or substantially similar refractive indexes as the first heat-resistant resin 110.

In an embodiment, the intermediate material 120 may be applied with the minimum thickness that can stably combine the second film 200 with the first film. In an embodiment, the intermediate material 120 may be applied with a thickness of about 0.5 µm to about 5 µm.

If a layer of less than about 0.5 µm of the intermediate material 120 is applied, a sufficient adhesive force may not be obtained. As such, the second film 200 may not be stably laminated and combined with the first film.

Moreover, if a layer of more than about 5 µm is applied to a first film with a thickness of about 20 µm to about 90 µm, the reduction in the coefficients of thermal expansion by the first film may be offset as a result of high coefficients of thermal expansion of the intermediate material 120. As such, the intermediate material 120 of such thickness may deteriorate size stability of the substrate, induce transmissivity deterioration of the substrate, and increase haze, resulting in degradation of the optical properties of the flexible substrate.

In an embodiment for which the optical properties of the substrate are not considered, such as for an organic EL display, various film gluing agents or film adhesives may be applied because transmissivity of the intermediate material 120 does not have to be accounted for.

(3) Step of Previously Manufacturing and Laminating the Second Film

Laminating and combing the second film 200 with the first film constitutes one of the main technical features of the flexible substrate. In addition, a relatively coarse surface roughness is another technical feature of interest for a first film having a low coefficient of thermal expansion. Previous methods of forming a coating layer required applying a liquid resin on a first film and hardening the applied resin. In an embodiment, a solidified resin film having good surface roughness is manufactured and prepared separate from the first film. The solidified resin film may then be laminated and combined with the first film using the intermediate material 120.

The separately manufactured second film 200 is configured with a second heat-resistant resin without double refraction. Any resin having excellent flatness, a film transmissivity of more than 85%, a haze of less than 4.6, and a glass transition temperature of more than 160° C. may be used as the second heat-resistant resin.

In other words, unlike conventional film structures that apply a liquid resin on a first film and harden the applied resin, a method of laminating a second film having good flatness formed through a separate process on the first film is employed. Hence, when the first film is combined with the second film 200 during the manufacture of the flexible substrate, an impregnation process such as a process of impregnating the glass cloth 100 in a first heat-resistant resin 110 is not necessary. As such, when the second film 200 is selected, matching of refractive indexes with the first heat-resistant resin 110 or the glass cloth 100 does not have to be accounted for.

Hence, in the case of a refractive index of the second heat-resistant resin, it does not matter even though the difference between the refractive index of the second heat-resistant resin and the refractive index of the first heat-resistant resin 110 exceeds 0.03. As such, when the flexible substrate is generated, the second heat-resistant resin is generally formed with a material different from the first heat-resistant resin 110. However, it is also possible to form with the same material when necessary. Accordingly, the types of applicable resins can be diversified, thereby reducing manufacturing costs.

In an embodiment in which the second heat-resistant resin is a UV hardening or thermal hardening resin, at least one resin selected from heat-resistant resins having more than 200° C. of glass transition temperature, such as polysulfone, polyether, polyether imide, and polyarylate (PAR), may be used. Alternate and/or additional resins may be used for the second heat-resistant resin within the scope of this disclosure.

The first film may be selected to generally improve thermal properties of the flexible substrate. However, a surface roughness may not be good because the glass cloth 100 is impregnated inside the first heat-resistant resin 110. The second film 200 may be used to improve the surface roughness of the flexible substrate by being laminated on the first film. However, if the second film 200 is too thick, the coefficient of thermal expansion of the second film 200 may offset the reduction in thermal expansion exhibited by the first film, and deteriorate the size stability of the flexible substrate. Accordingly, the second film 200 should be of a thickness that can improve surface roughness while not substantially affecting the reduction of thermal expansion by the first film.

Thus, the second film 200 is thinner than the first film. In an embodiment, the first film has a thickness of about 20 µm to about 90 µm, and the second film 200 has a thickness of about 10 µm to about 50 µm.

In the aforementioned embodiment, the second film 200 may be laminated on the first film using the intermediate material 120. Alternately, the second film 200 may be directly laminated on the first film. In the latter case, a boundary surface between the first film and the second film 200 may adhere the films by being thermally hardened or UV-hardened.

In an alternate embodiment, the second film 200 may improve size stability of the flexible substrate through realization of low coefficients of thermal expansion by adding additives to the second heat-resistant resin. For example, when the second film 200 is manufactured, inorganic particle fillers can be dispersed within the liquid second heat-resistant resin to enhance size stability and thermal properties of the second film 200.

In an embodiment, an ultrafine ceramic powder having a refractive index that substantially matches the resin that constitutes the flexible substrate may be used as the inorganic particle fillers. Specifically, a ceramic powder having a refractive index that differs from the refractive index of the resin by approximately 0.01 may be used. In an embodiment, the particle fillers may have a particle size that is less than about 200 nm. In an embodiment, the particle fillers may have a particle size that is less than about 100 nm.

When the flexible substrate is applied to a display device that transmits light, such as a liquid crystal display device panel, light selectively transmitted by a liquid crystal may be displayed to a user after passing through a second film 200. As such, if the second film 200 contains inorganic particle fillers, a difference in the refractive index difference of the inorganic particle fillers and the refractive index of the resin should be minimized to prevent deterioration of picture quality caused by such difference.

In addition, if a particle size of the inorganic particle fillers is greater than about 200 nm, light may be dispersed on an interface with the resin owing to the particle size, which may result in an increase of haze. As such, inorganic particle fillers having a particle size less than about 200 nm may be used.

The inorganic particle fillers should be made of an inorganic material having low coefficients of thermal expansion to lower the coefficients of thermal expansion of the second film 200. In an embodiment, an ultrafine ceramic powder having a CTE less than 8 ppm may be used.

In an embodiment, any inorganic particle fillers that satisfy determined optical properties, such as haze and transmissivity required by a display device, may be dispersed in the second film 200.

As mentioned above, a second film 200 having inorganic particle fillers with low coefficients of thermal expansion may offset a high coefficient of thermal expansion for the second heat-resistant resin. Accordingly, the second film 200 containing the inorganic particle fillers may increase size stability for a flexible substrate as compared with a second film 200 comprised only of a second heat-resistant resin.

Moreover, although the above-described embodiment merely includes inorganic particle fillers dispersed and contained in the second film 200, the inorganic particle fillers may be dispersed in the first film to improve its thermal properties.

For a second film 200 manufactured according to the above process, the second film may be laminated to the first film using intermediate material 120. The solidified second film 200 may be laminated on the first film where the intermediate material 120 is applied, and the second film may be exposed to UV rays or heat to laminate and combine the second film with the first film.

Moreover, metal chemicals can be additionally mixed with the first heat-resistant resin and/or the second heat-resistant resin to obtain UV stability or thermal stability. In an embodiment, UV stability or heat resistance of the heat-resistant resins may be improved by dispersing and containing titanium dioxide ($TiO_2$) particles in a UV hardening resin or a thermal hardening resin used for one or more of the first heat-resistant resin and the second heat-resistant resin.

Figure 4:
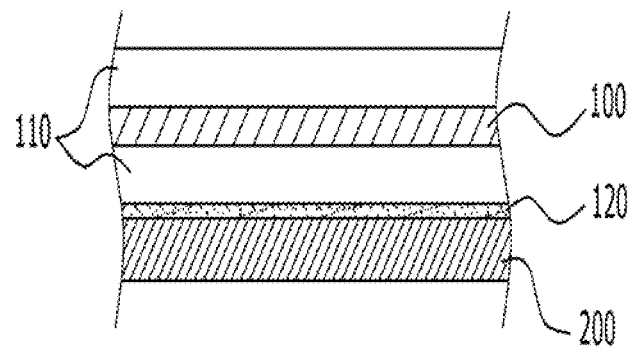
FIG. 4 is a sectional view of a flexible substrate in accordance with an embodiment.

FIG. 4 is a sectional view of a flexible substrate in accordance with an embodiment. In an embodiment, the manufacturing process used to manufacture the flexible substrate of FIG. 4 may be similar to that described above. Accordingly, only a difference between the two flexible substrates is explained below. In the embodiment suggested in FIG. 4, an intermediate material 120 is applied to only one side of a first film, and a second film 200 is laminated on the side on which the intermediate material 120 is applied. Though the flexible substrate of the embodiment suggested in FIG. 4 has a similar function to the flexible substrate of the aforementioned embodiment, it corresponds to a substrate structure which considers thermal stability more than contrast improvement in accordance with enhancement of surface roughness.

Table 1 shows actually measured data that measures each of thermal and optical properties and the embodiments of the flexible substrate in accordance with the present invention manufactured by using the aforementioned methods.

TABLE 1

|  | Embod. 1 | Embod. 2 | Embod. 3 | Embod. 4 | Embod. 5 | Embod. 6 |
| --- | --- | --- | --- | --- | --- | --- |
| 1$^{st}$ Film Thickness (μm) | 20 | 30 | 40 | 50 | 30 | 40 |
| 2$^{nd}$ Film Thickness (μm) | 20 | 30 | 40 | 10 | 20 | 30 |
| Haze | 2.7 | 5.2 | 6.5 | 3.8 | 3.2 | 4.1 |
| Coefficients of Thermal Expansion (ppm/° C.) | 13 | 17 | 19 | 15 | 16 | 17 |
| Transmissivity 550 nm (%) | 91 | 89 | 88 | 89 | 90 | 89 |
| Surface Roughness (nm) | 25 | 14 | 12 | 17 | 22 | 19 |
| Retardation (nm) | 10 | 10 | 10 | 10 | 10 | 10 |

In the embodiments of Table 1, a bisphenol A ethoxylate diacrylate UV hardening resin is used as the first heat-resistant resin. For the second heat-resistant resin, a thermal hardening resin, a poly arylate resin having a chemical formula I and having a transition temperature of around 320° C., is used.

Chemical Formula 1

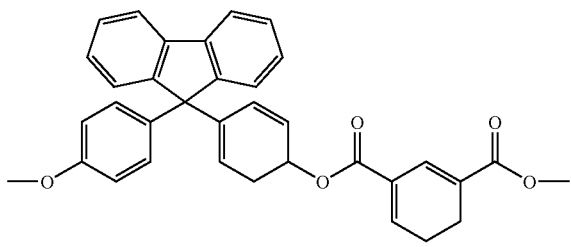

In the embodiments of Table 1, the thickness of the first film is within a range of about 20 μm to about 50 μm and the thickness of the second film 200 is within a range of about 10 μm to about 40 μm. As such, the total thickness is within a range of about 50 μm to about 100 μm in order to realize the best flexible functionality of the display device. The 'Retardation' entry in Table 1 refers to a phase difference between an incident light and an emitted light.

As shown in Table 1, it is noted that the flexible substrate for formulating a film complex through an organic combination between the first film and the second film can obtain a transmissivity of more than 85% and a coefficient of thermal expansion of less than 20 ppm/° C. In addition, Table 1 displays that it is possible to obtain a flexible substrate for a display panel having an improved surface roughness up to about 12 nm.

Moreover, the flexible substrate configures a film complex by laminating the separately manufactured solidified second film on the first film, thereby preventing curl generation caused by contraction and expansion of the substrate via a very simple manufacturing process. As a result, scalability can be easily accomplished and productivity can be improved.

The flexible substrate can ensure a reduction in a coefficient of thermal expansion through a simple manufacturing process, while obtaining improvement of surface roughness. As such, it has a very high industrial applicability.

What is claimed is:

1. A flexible substrate for a display panel comprises a film complex structure, comprising:
   a first film having a glass cloth located within a first heat-resistant resin; and
   a second film laminated on at least one side of the first film, wherein the second film comprises a second heat-resistant resin and an ultrafine ceramic powder, and
   the ultrafine ceramic powder has a refractive index that is within 0.01 of a refractive index of the second heat-resistant resin, has a particle size of less than about 200 nm, and has a coefficient of thermal expansion that is less than about 8 ppm/° C.

2. The flexible substrate of claim 1, wherein the thickness of the second film is less than the thickness of the first film.

3. The flexible substrate of claim 1, wherein the second heat-resistant resin comprises a resin selected from polysulfone, polyether, polyether imide, and polyarylate (PAR), wherein the second heat-resistant resin has more than 200° C. of glass transition temperature.

4. The flexible substrate of claim 1, wherein the second film has a transmissivity of more than 85%, a haze of less than 4.6, and glass transition temperature greater than 160° C.

5. The flexible substrate of claim 1, wherein a difference between the refractive index of the glass cloth and the refractive index of the first heat-resistant resin is less than 0.01.

6. The flexible substrate of claim 1, wherein titanium dioxide ($TiO_2$) particles are dispersed and contained inside one or more of the first heat-resistant resin or the second heat-resistant resin.

7. The flexible substrate of claim 1, wherein the flexible substrate for the display panel has a total thickness of about 30 μm to about 200 μm.

8. The flexible substrate of claim 1, wherein the first heat-resistant resin comprises a resin selected from polysulfone, polyether, polyether imide, and polyarylate (PAR), wherein the first heat-resistant resin has more than 200° C. of glass transition temperature.

9. The flexible substrate of claim 8, wherein the first heat-resistant resin and the second heat-resistant resin comprise the same type of resin.

10. The flexible substrate of claim 1, further comprising an intermediate material between the first film and the second film, wherein the intermediate material is applied to an outer part of the first film, wherein the intermediate material adheres the first film to the second film.

11. The flexible substrate of claim 10, wherein the first heat-resistant resin and the intermediate material comprises the same type of resin.

12. The flexible substrate of claim 10, wherein the intermediate material has a thickness of about 0.5 μm to about 5 μm.

* * * * *